Patented Dec. 2, 1952

2,620,279

UNITED STATES PATENT OFFICE 2,620,279

SET STABILIZED LOW CONSISTENCY CALCINED GYPSUM PRODUCT

Charles T. Clark, Chicago, Ill., assignor to United States Gypsum Company, Chicago, Ill., a corporation of Illinois No Drawing. Application November 12, 1949, Serial No. 126,924

3 Claims. (Cl. 106—114)

The present invention relates to a new composition of matter which, when incorporated with calcined gypsum cements, imparts novel and valuable properties thereto; the invention also concerning itself with the preparation of an additive to be incorporated with calcined gypsum for the purpose of modifying its properties.

It has already been proposed, as see for example the patents to Gardner 1,996,372, Scholz 2,032,071, and Dailey 2,292,616, to incorporate various mixtures of gums, such as gum arabic, and alkaline materials, for example, lime, with calcined gypsum plasters for the avowed purpose of lowering the consistency thereof. The effect of these additions of mixtures alkaline-reacting substances and, for example, gum arabic was to make it possible to produce a pourable mixture with a smaller amount of water than ordinarily would have been necessary to produce a pourable mixture from the particular cementitious material, had the addition of the gum arabic and alkaline material not been made. In these prior art proposals, however, a mere physical mixture of the gum arabic and the alkali was employed, and no attempt was made to produce a fully reacted product which could be added to given amounts of, for example, calcined gypsum plasters to produce a predetermined and definite lowering in the consistency thereof.

In accordance with the present invention, however, it was found that greatly improved results were obtainable if the gum arabic were previously reacted at increased temperatures with certain quantities of an alkaline-reacting material so as to neutralize completely the acid-reacting substances therein contained. For this purpose one of the outstanding features of the present invention is the deliberate predigestion of the gum, such as gum arabic, with a sufficient quantity of an alkaline-reacting material not only to neutralize any acidic substances therein, but also partially to hydrolyze some of the other constituents inherent in the gum by the alkaline-reacting material and the effects of the heat.

By using such pre-reacted material, gypsum cements of definitely predetermined setting characteristics can be obtained, which are characterized by the further highly valuable property of remaining in the condition in which they were made, particularly as concerns not only their consistency but particularly their setting time. In other words, by the practice of the present invention it is not only possible to produce gypsum cements of extremely low consistency, but also such cements as are stabilized as to their setting time, so that the latter will not be greatly altered by increase in temperature or by storage under humid conditions for extetnded periods of time.

It appears that the materials made in accordance with the hereinabove mentioned prior art suffered from the defect that their setting time would gradually increase as they were stored, or would become greater if they were used under an environment in which the temperature was considerably above normal. This problem is particularly of moment in connection with the sealing of oil wells in which, as is well known, gypsum cements are employed, being poured into the bore at the bottom of the well where they are very likely to encounter temperatures which may be as high as 150° F. However, when practicing the present invention, it is possible to produce gypsum cement plasters whose setting time, when once predetermined by the proper balance of retardive and accelerative influences, will remain at the setting point determined upon irrespective as to the length of time of storage or the temperature at which the cement is expected to be used. It could not have been foreseen that the pretreatment of the gum arabic would have this effect, and the present invention as primarily predicated upon this entirely unforeseen and unexpected result.

The particular value of the present invention lies, for example, in using gypsum cements for cementing oil wells, and particularly when using them for the so-called nitroglycerine shooting of the wells. It is noted that the time-fuse employed for detonating the nitroglycerine charge is usually set to explode at a given time which is predicated upon the expected and intended setting time of the gypsum cement. If for any reason such setting time be delayed, the charge might explode before a proper and solid sealing of the plug is accomplished within the bore above the nitroglycerine charge, with the result that the maximum effect of the explosion is not obtained. Moreover, premature explosion may result in serious damage to the casings and the well-rigging, because there is a tendency to blow the material out of the bore hole or casing.

The ordinary oil well cements, such as have been made in accordance with the Dailey patent, are compounded from calcined gypsum, gum arabic, and either Portland cement or lime, and have a normal setting time within the range of from 10 to 25 minutes. As, however, it is desirable to have them set in from 60 to 90 minutes, it has been the practice to add certain well known retarders to these mixtures. However, it has been found that the setting time of such compositions does not remain stable under many conditions of storage and use. For example, if the temperature of the calcined gypsum employed as the major ingredient exceeds about 110° to about 115° F. at the time when the dry mixture is prepared, the setting time of the finished cement will increase rapidly, the amount of such lengthening being dependent upon the mixing temperature and the length of time required to cool the mixed ingredients.

Furthermore, storage under atmospheric conditions of high humidity also results in rapid increase in the setting time. The setting time is also increased by shipment or storage at temperatures exceeding 100° F. It has been found by actual experience that the setting times of such cements which were maintained under storage conditions of high humidity or high temperature storage conditions, or both, may increase to three or four times their original values in from three to four weeks. Moreover, the setting time also increases rapidly as the temperature of the slurries exceeds 100° F. For instance, a slurry which would ordinarily set within sixty minutes at a temperature of between about 70° to 100° F., may rise to as high as 8 to 10 hours at 150° F. This limitation counter-indicates the use of such cements in deep wells where temperatures of exceeding 130° to 140° F., are often encountered.

It has been found that the pretreatment of the gum arabic with the proper type of alkaline-reacting material prior to its addition to the calcium sulfate cements provides a composition possessing the desirable properties of reduced consistency, improvement in ultimate strength, and lessened tendency to lengthening of setting time under adverse mixing and storage conditions.

In general it is preferred to mix an aqueous solution of gum arabic with anywhere from 1% to 100% of its weight of, for example, calcium hydroxide. The amount of water present during this treatment is of no great moment, but for purposes of economy it is preferred to keep it at a minimum. Thus from 30% to 50% of water, based on the weight of the gum arabic, has been found satisfactory, although the amount of water employed may be raised far above these limits. In any event, however, the mixed slurry of gum arabic and the alkaline material is preferably heated to an elevated temperature in order to carry the reaction between the reactive constituents of the gum arabic and the alkaline material to substantial completion. It was found that a digestion time of from 5 to 30 minutes at a temperature within the range of from about 200° F. to about 300° F. produces desirable results. Of course, if the temperatures are above the boiling point of water, the digestion must be carried out in a suitable closed vessel, such as an autoclave, in order to permit the attainment of the desirable temperature without loss of water by boiling. However, satisfactory results are obtainable by digestion at lower temperatures than those hereinabove indicated, and without the use of pressure, but under these conditions a longer digestion time is required.

As hereinabove indicated, the amount of percentage of the alkaline material used is not critical, provided only that a sufficient amount be used completely to react with the gum arabic so as to produce a final alkaline-reacting product. With the normally available commercial forms of gum arabic (acacia) about ¼% of calcium hydroxide is required to neutralize such a gum. It is preferred to use not more alkali than is really necessary, although an excess will do no harm. In general, and for the purposes of the present invention, it is preferred to employ from about 1% to about 5% of calcium hydroxide, by weight, on the weight of the gum arabic treated.

As substitutes for the calcium hydroxide other alkaline-reacting materials may be used, provided only that they are at least more basic than magnesium hydroxide, which is one of the materials which can be used. Others are the hydroxides or carbonates of potassium and sodium, or the hydroxides of barium and strontium. If magnesium hydroxide is used it should be in finely ground condition and heat and pressure had best be employed; in fact, it is advisable to start with a magnesium oxide of a reactive type so that it will more quickly form the desired compounds of the constituents of the gum arabic reactive therewith.

It has also been found that such completely alkali-neutralized gum arabic is in itself a very effective set retarder for calcined gypsum, so that other retarders will not be necessary. For example, it has been found that any calcined gypsum cement or plaster containing about ½% to 1% of the alkali-reacted gum will, without the addition of further retarders, have a normal setting time of about 90 to 150 minutes, depending somewhat upon the degree of digestion of the gum arabic slurry with the calcium hydroxide or other alkali employed. Increasing the percentage of lime and increasing the digestion time of the alkali-reacted gum arabic will increase the retardive efficiency of such gum. This effect is of particular value when it is used as a retarder in calcined gypsum well-sealing cements.

As, however, the setting time of such a product is somewhat longer than is desired by the users, it has been found desirable to decrease the setting time, that is to say to speed up the setting, by incorporating known set-accelerators, such as finely ground gypsum, potassium sulfate, and the like, so as to counteract to some extent the retardive effect of the alkali-reacted gum arabic. Thus, the amounts of the alkali-reacted gum arabic retarder and the accelerators may be balanced to produce any desired setting time within the range of say from about 30 to 150 minutes. Usually the plaster is adjusted to set within 60 minutes.

Another means of achieving setting time control when a fixed amount of the gum is to be included in the composition is to employ mixtures of alkali-reacted and unreacted gum arabic in such proportions as may be required to produce the desired setting time without the need for adding other accelerators.

Furthermore, the formulation of the alkali-reacted gum as well as the treatment thereof may be regulated within limits so as to develop most of the desirable qualities of setting time stability without much development of the retardive effects.

As an example of a specific method of preparing products forming one of the subject matters of the present invention is to mix five parts of high calcium hydrated lime with 40 parts of water, preferably hot, followed by the addition of 100 parts of gum arabic. This will form a doughy mass which is mixed together for at least five minutes and preferably longer and is then digested at a temperature of about 200° F. for about 30 minutes. The longer the digestion time the greater will be the retardive effect of the product. The reaction temperature, however, may be lower than above indicated, but in this case the time must be greatly increased. In fact, it was found rather surprisingly that dry gum arabic could be reacted with the lime at comparatively high temperatures, but the results are not such that they would be the preferred embodiment, but it is mentioned as a possibility. Moreover, the amount of lime may be varied within wide limits but using more than an equal weight of lime, that is to say, beyond about 100% by weight of the gum, is of no great value, as this will have a tendency somewhat to increase the consistency of certain types of natural low-consistency plasters, such as alpha gypsum (see U. S. Patent 1,901,051).

One of the outstanding advantages already mentioned is the stability of the setting time of the resulting plasters, and the fact that they may be used in wells having a temperature as high as about 160 to 170° F.

Moreover, the setting time of such gypsum cement slurries is not too adversely affected by the hardness of the water used when alkaline-reacted with gum arabic treated in accordance with the present invention is present.

These facts are demonstrated by the following tables which compare the properties of gypsum cements when compounded with ordinary gum arabic and with alkali-reacted gum arabic. The formation of the cements employed for these tests were as follows:

|  | Formulation | |
|---|---|---|
|  | Prereacted gum | Natural gum |
| "Alpha" gypsum............lbs.. | 2,000 | 2,000 |
| Portland cement...........lbs.. | 20 | 20 |
| Gum......................lbs.. | 7 | 7 |
| Terra Alba...............lbs.. | (¹) | 10 |
| Commercial retarder......lbs.. |  | (¹) |

¹ As required to give a 60-minute set.

The prereacted gum arabic used in this test was made by heating a slurry of 40 parts of water, 100 parts of gum arabic, and 5 parts of calcium hydroxide for 1½ hours at 195° F., followed by drying at 162° or 300° F., and then grinding.

The effects upon the plaster under various conditions are set forth in the subjoined tables, showing not only the effect of the kind of water used but also the differences brought about by the amount of lime and the behavior of the plasters under heat, aging, and humid storage. The tables are substantially self-explanatory.

TABLE I

*Effect of water upon setting time variation*

| Water Used, Kind | Initial Vicat Set | | |
|---|---|---|---|
|  | Temp. (°F.) | Natural Gum Formula | Prereacted Gum Formula |
|  |  | Minutes | Minutes |
| Distilled................. | 75 | 60 | 60 |
| Hard (25 grains CaCO₃ per gallon)................ | 75 | 77 | 63 |
| Hot...................... | 150 | 240 | 88 |

TABLE II

*Effect of percentage of lime in prereacted gum upon the time of set after aging of a plaster*

| Test Conditions | Control, Natural Gum Formula | Prereacted Gum Formula: Percent Lime based on Gum | | | | | |
|---|---|---|---|---|---|---|---|
|  |  | ½ | 1 | 2½ | 5 | 10 | ¹ 25 |
| Heat Aging, 11 weeks at 140° F., set in minutes.......... | 240 | 260 | 192 | 126 | 120 | 120 | 103 |
| Humid Aging, 1-7 days, maximum set in minutes......... | 83 | 73 | 68 | ..... | 64 | 65 | 64 |

¹ 9¼ pounds per ton of this gum were used to compensate for the large amount of lime.

The prereacted gums used in the tests shown in Table II were made by adding the stated percentage of lime to a mixture of 40 parts of water and 100 parts of gum arabic, and heating the mixture for 1½ hours at 195° F., and then drying the resulting product for 16 hours at 300° F.

A test was also made to demonstrate the relative stability of mixtures made in accordance with the present invention when stored for long periods at high temperatures. Thus two mixtures originally adjusted so as to set at 60 minutes, and containing the amounts of materials set forth in the tabulation preceding Table I (i. e. 7 lbs. of gum arabic and 20 lbs. of Portland cement per 2000 lbs. of "alpha" gypsum) were stored for 10 weeks at 140° F. At the end of this time the mixture containing the raw gum arabic had increased in setting time to 780 minutes, while the mixture containing the alkali-cooked gum arabic had increased in setting time to only 132 minutes.

When other alkaline-reacting materials are employed in place of the lime, they should be used in substantially stoichiometric proportions. The following examples are arranged in tabular form, and are based on the amounts equivalent to 5% of Ca(OH)₂ on the weight of the gum arabic; i. e. the results are to be compared with mixtures made with gum arabic treated with 5% of hydrated lime.

TABLE III

| Type of alkaline material used in reaction | Sr(OH)₂ | Ba(OH)₂ .8H₂O | NaOH | KOH | Dolomitic Hydroxide |
|---|---|---|---|---|---|
| Amount used in reaction, based on gum formulation, (stoichiometric relation, Ca(OH)₂ as 5).............percent.. | 8.2 | 21.3 | 5.4 | 7.6 | 4.4 |
| Alpha gypsum, parts by weight........... | 2,000 | 2,000 | 2,000 | 2,000 | 2,000 |
| Portland cement, parts by weight........ | 20 | 20 | 20 | 20 | 20 |
| Reacted gum, parts by weight........... | 7 | 7 | 7 | 7 | 7 |
| Terra alba, parts by weight............. | 80 | 45 | 40 | 40 | 35 |
| Normal consistency cc./100 gms........ | 34 | 34 | 35 | 35 | 34 |
| Initial Set (Vicat), minutes............ | 63 | 68 | 65 | 64 | 67 |
| Set after aging for 11 weeks at 140° F., minutes.............................. | 110 | 127 | 112 | 110 | 129 |

In the claims, the term "alkali-reacted" is intended to cover reaction with any alkaline-reacting material at least as basic as $Mg(OH)_2$.

As an example of the use of magnesium oxide and hydroxide the following is given:

| | Parts by weight |
|---|---|
| Gum arabic | 100 |
| Finely ground magnesium oxide | 6 |
| Water | 80 |

In this case the magnesium oxide and the gum arabic are mixed dry and then triturated with water, the resulting mixture then being heated, preferably in a sealed vessel so as not to lose water by evaporation, at a temperature of about 212° F. for 1½ hours. This reacted material is then dried at about 220° F. and eventually ground so as to pass through a 100 mesh sieve. While this compound is quite usable, it is not as good as that made, for instance, with calcium hydroxide.

There is considerable latitude in the amounts of alkali reacted gum arabic and the other alkaline-reacting materials that may be used, while still obtaining a marked reduction in consistency, coupled with stability on storage. Thus lime as well as sodium hydroxide may be used to render the plaster composition alkaline. However, Portland cement represents the preferred embodiment. In the subjoined table, the figures are all based on 2000 parts by weight of an alpha gypsum that had a consistency of 45 cc. per 100 grams.

TABLE IV

*Consistency produced by varying amounts of alkali-reacted gum arabic and varying alkaline materials*

| | Parts by weight | | | | | |
|---|---|---|---|---|---|---|
| Gum arabic | 10 | 20 | 7 | 10 | 7 | 4 |
| Portland cement | 50 | 500 | | | 10 | 20 |
| Lime | | | 5 | | | |
| NaOH | | | | ¹3 | | |
| Consistency | 35 | 28 | 40 | 28 | 38 | 39.5 |
| Reduction in consistency | 10 | 17 | 5 | 17 | 7 | 4.5 |

¹ Added as a 0.2442 N solution of NaOH to the gauging water.

The useful ranges thus are from about 4 to 20 parts of the alkaline reacted gum arabic and from about 10 to 500 parts of the Portland cement.

While the improvements hereinabove described are of particular value in connection with oil well cements, it will be self evident that they are also applicable to plaster compositions, such as casting plasters, in which a low consistency high strength material with improved set stabilized properties is required.

In the above description of the present invention, and in the subjoined claims, the term "gum arabic" is intended to cover generically all these types of acacia gums which are commercially known and available under the generic term of "gum arabic."

The instrumentalities employed for carrying out the present invention are very well known, and consist merely of suitable metal vessels or autoclaves, provided they are made of materials resistant to alkali, for which reason aluminum vessels would be counter-indicated.

Applicant claims:

1. An improved gypsum plaster characterized by low consistency and stable setting time not substantially altered by humid storage or use at above normal room temperatures, comprising calcined gypsum, an accelerator, and complete-neutralized gum arabic which has been reacted with an alkaline-reacting material at least as basic as $Mg(OH)_2$ at above about 150° F. prior to its addition to said plaster.

2. A calcined gypsum composition, stabilized as to its setting time against the influence of storage at above room temperature and under humid conditions, comprising about 2000 parts by weight of calcined gypsum, about 10 to about 500 parts by weight of Portland cement, and about 4 to about 20 parts by weight of a completely neutralized gum arabic which has been reacted with an alkaline-reacting material at least as basic as $Mg(OH)_2$ at above about 150° F. prior to its addition to said composition.

3. An oil well cement comprising about 2000 parts by weight of alpha gypsum, about 20 parts by weight of Portland cement, about 7 parts by weight of gum arabic, the acidic constituents of which have been substantially completely neutralized by and reacted with calcium hydroxide by heating said gum arabic therewith at above about 150° F. prior to its addition to said alpha gypsum, and sufficient amounts of commercial retarder and accelerator to give the freshly prepared cement a setting time of about 60 minutes at room temperature.

CHARLES T. CLARK.

REFERENCES CITED

The following references are of record in the file of this patent:

UNITED STATES PATENTS

| Number | Name | Date |
|---|---|---|
| 483,307 | Lamprey | Sept. 27, 1892 |
| 1,263,634 | Alexander | Apr. 23, 1918 |
| 1,983,650 | Wolfe | Dec. 11, 1934 |
| 1,996,372 | Gardner | Apr. 2, 1935 |
| 2,032,071 | Scholz | Feb. 25, 1936 |
| 2,292,616 | Dailey | Aug. 11, 1942 |
| 2,362,060 | Etridge et al. | Nov. 7, 1944 |